(12) United States Patent
Sun et al.

(10) Patent No.: US 9,702,774 B1
(45) Date of Patent: Jul. 11, 2017

(54) TORQUE DETECTING DEVICE

(71) Applicant: Automotive Research & Testing Center, Lugong (TW)

(72) Inventors: Fu-Hsien Sun, Lugong (TW);
Hsien-Yu Kuo, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 0 days.

(21) Appl. No.: 14/984,711

(22) Filed: Dec. 30, 2015

(51) Int. Cl.
| | | |
|---|---|---|
| *G01L 3/00* | (2006.01) | |
| *G01L 3/10* | (2006.01) | |
| *F16H 1/28* | (2006.01) | |
| *F16H 37/08* | (2006.01) | |
| *G01L 3/14* | (2006.01) | |

(52) U.S. Cl.
CPC ............... *G01L 3/105* (2013.01); *F16H 1/28* (2013.01); *F16H 2037/0886* (2013.01); *G01L 3/1471* (2013.01)

(58) Field of Classification Search
CPC .. F16H 2037/0886; F16H 37/084; F16H 9/10; Y10T 477/6217; G01L 3/1471; G01L 3/105
USPC ...................... 73/862.331, 862.325, 862.334
See application file for complete search history.

(56) References Cited

U.S. PATENT DOCUMENTS

| | | | | |
|---|---|---|---|---|
| 5,265,019 A * | 11/1993 | Harara | ................... | B62D 6/003 180/422 |
| 5,423,391 A * | 6/1995 | Shimizu | ................ | B62D 5/008 180/446 |
| 7,900,714 B2 * | 3/2011 | Milbourne | ........... | B23B 45/008 173/176 |
| 8,398,521 B2 * | 3/2013 | Bu | ......................... | F16D 43/10 475/262 |
| 8,714,245 B2 * | 5/2014 | Sihler | .................... | E21B 4/006 166/255.2 |
| 9,470,272 B2 * | 10/2016 | Gitnes | ...................... | F16D 7/00 |

FOREIGN PATENT DOCUMENTS

CN           101825425 A           9/2010

* cited by examiner

*Primary Examiner* — Max Noori
(74) *Attorney, Agent, or Firm* — Hamre, Schumann, Mueller & Larson, P.C.

(57) ABSTRACT

A torque detecting device is adapted to be mounted to a torque transmitting device. The torque transmitting device includes rotatable input and output shafts. The torque detecting device includes input and output gears for being sleeved respectively on the input and output shafts and a planet gear unit that includes a ring gear meshing with the input gear, a sun gear disposed in the ring gear, a carrier gear meshing with the output gear, and a plurality of planet gears. The planet gears are coupled rotatably to the carrier gear, are disposed between the sun and ring gears, and mesh with the ring and sun gears such that, when the input gear is rotated relative to the output gear by an angle, the sun gear is driven to rotate reversely by a larger angle.

17 Claims, 8 Drawing Sheets

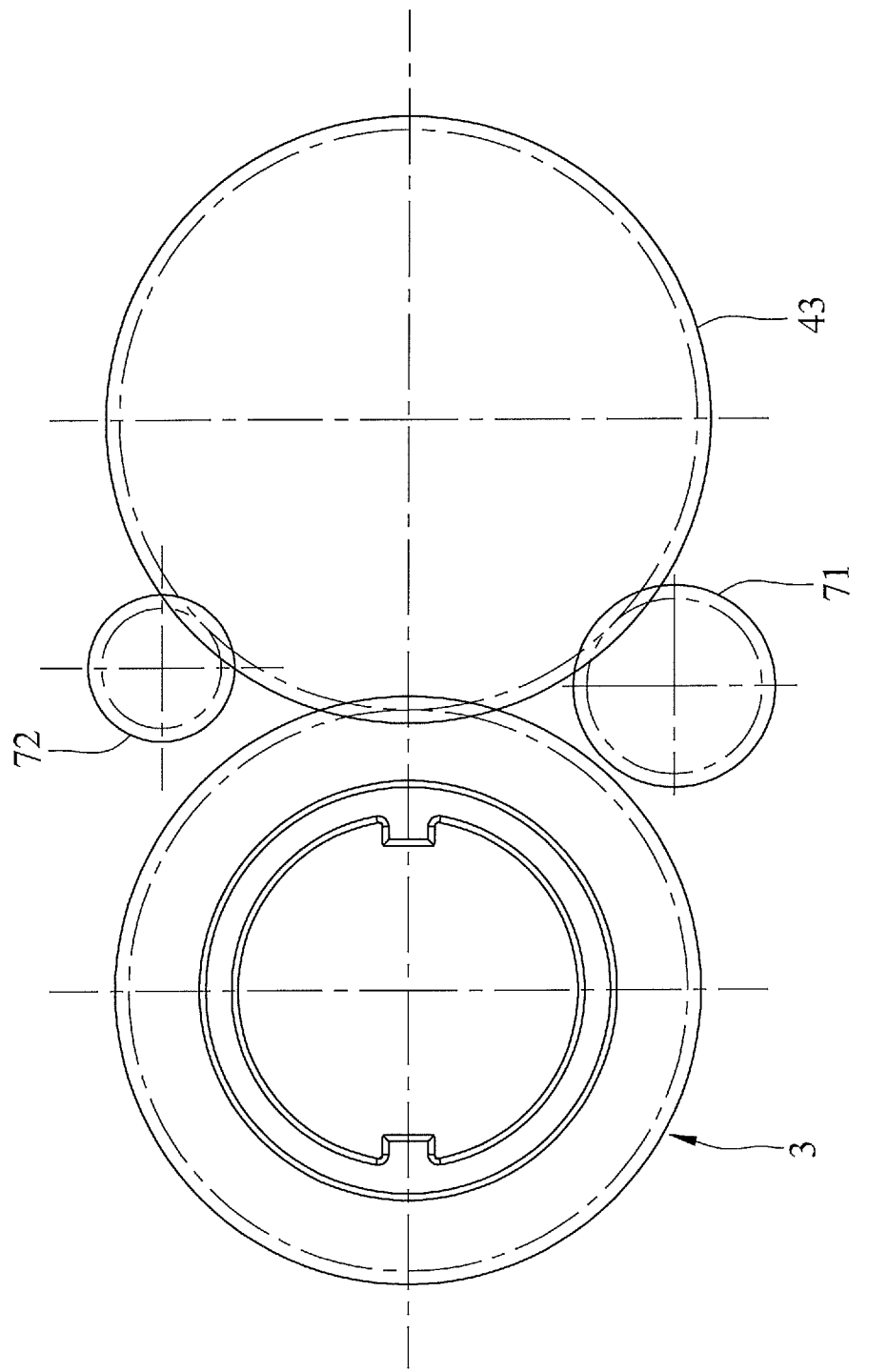

TORQUE DETECTING DEVICE

FIELD

The disclosure relates to a torque detecting device, more particularly to a torque detecting device that is capable of linear amplification of a rotational angle of a torsion bar.

BACKGROUND

Referring to FIG. 1, in order to enable a driver to more easily control a vehicle, a vehicle steering system is provided with a power assistance function. In the existing market, an ordinary vehicle is usually provided with an electric power steering system 91 (abbreviated as an EPS system).

The main function of a torque detector 92, which is a key component of the EPS system, is to detect the steering torque exerted by the driver when turning a steering wheel 93. Such goal is accomplished by mounting the torque detector 92 on a torsion shaft (not shown) to detect the angular change of the torsion bar so as to generate an output signal corresponding to the angular change.

The torque detecting devices currently available in the market are generally operated under the principle of Hall effect. Referring to FIG. 2, a conventional torque detecting device is equipped with a Hall induction system, and includes a rotor 95, a pair of stators 96 and a Hall element 97. The rotor 95 is fixed in an end of a torque transmitting device (not shown) which has a torsion bar disposed therein, and has an outer ring mounted with a plurality of magnets that have N-S poles arranged one after another. Each of the stators 96 has a plurality of claws, is fixed to the other end of the torque transmitting device, and is made of material with magnetic permeability. The Hall element 97 is fixed to a housing of the conventional torque detecting device for sensing the magnetic flux. Upon rotation of an input shaft relative to an output shaft, the rotor 95 is moved relative to the stators 96, thereby resulting in a change of magnetic flux. In this way, the Hall element 97 can sense changes in magnetic flux so as to determine a torque value.

The hall element 97 can be used to determine the torque value according to the relative angle generated between the input shaft and the output shaft of the torque transmitting device. However, since the rotation of the input shaft relative to the output shaft is relatively small, a high degree of precision is required for the structures of the Hall element 97 and other related elements.

Chinese Patent No. CN101825425B discloses another conventional torque detecting device for sensing a rotational angle of a shaft relative to another shaft. The conventional torque detecting device includes two planet gear units. Each planet gear unit has a sun gear coupled to a respective one of the shafts, and a detecting gear coupled to the sun gear. The rotation of the shaft relative to the another shaft results in relative movement between the sun gears of the two planet gear units. Since the numbers of teeth of the detecting gears of the two planet gear units are different, the detecting gears of the two planet gear units are rotated in different rotational angles. As such, a steering torque can be calculated using the data of the rotational angles and the numbers of teeth of the detecting gears of the two planet gear units.

However, the configuration in which two planet gear units are employed results in a relatively complicated structure and high cost associated with the aforementioned conventional torque detecting device. Moreover, the calculation method in obtaining the steering torque is quite complex.

SUMMARY

Therefore, the object of the disclosure is to provide a torque detecting device that can be conveniently operated, and that is capable of linear amplification of a detecting range so as to increase the detecting accuracy.

Accordingly, a torque detecting device is adapted to be mounted to a torque transmitting device. The torque transmitting device includes rotatable input and output shafts. The torque detecting device includes an input gear adapted to be sleeved on the input shaft, an output gear adapted to be sleeved on the output shaft, and a planet gear unit.

The planet gear unit includes a ring gear that meshes with the input gear, a sun gear that is disposed in the ring gear, a carrier gear that meshes with the output gear, and a plurality of planet gears. The planet gears are coupled rotatably to the carrier gear, are disposed between the sun gear and the ring gear, and mesh with the ring gear and the sun gear such that, when the input gear is rotated in a rotational direction relative to the output gear by a first angle, the sun gear is driven to rotate in an opposite rotational direction by a second angle that is greater than the first angle.

By virtue of the present of the planet gear unit and the arrangements among internal teeth of the ring gear, the sun gear, the planet gears, the carrier gear, the input gear and the output gear, the additional rotational angle between the input shaft and the output shaft can be enlarged via the sun gear, thereby facilitating torque calculation and capable of linear amplification of a detecting range so as to increase the detecting accuracy.

BRIEF DESCRIPTION OF THE DRAWINGS

Other features and advantages of the present disclosure will become apparent in the following detailed description of the embodiment with reference to the accompanying drawings, of which:

FIG. 8 is a schematic diagram, illustrating the structural relationship among a first gear, a second gear, an output gear and a carrier gear of the embodiment.

DETAILED DESCRIPTION

Figure 1:
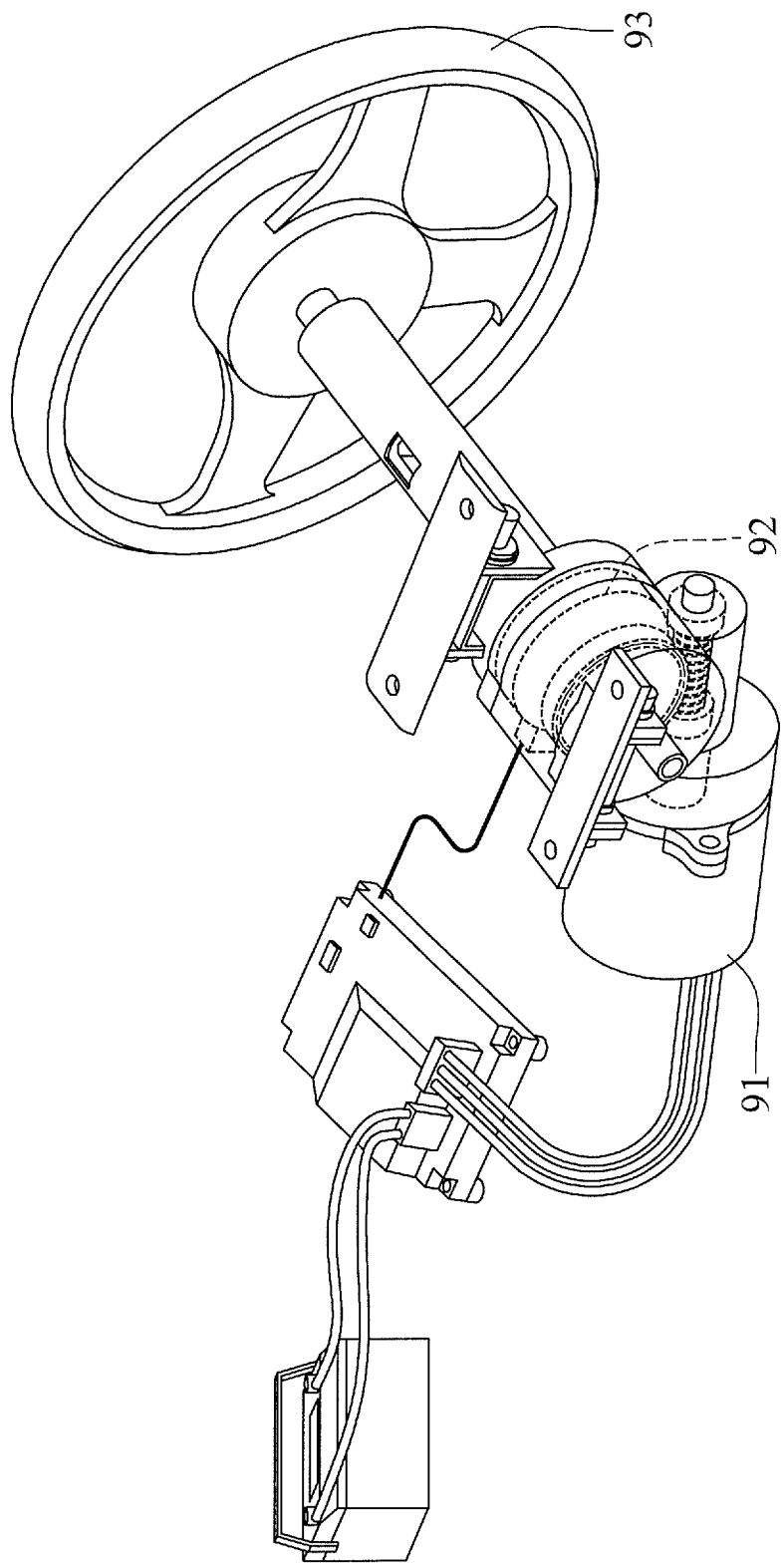
FIG. 1 is a perspective view of an EPS system.
Figure 2:
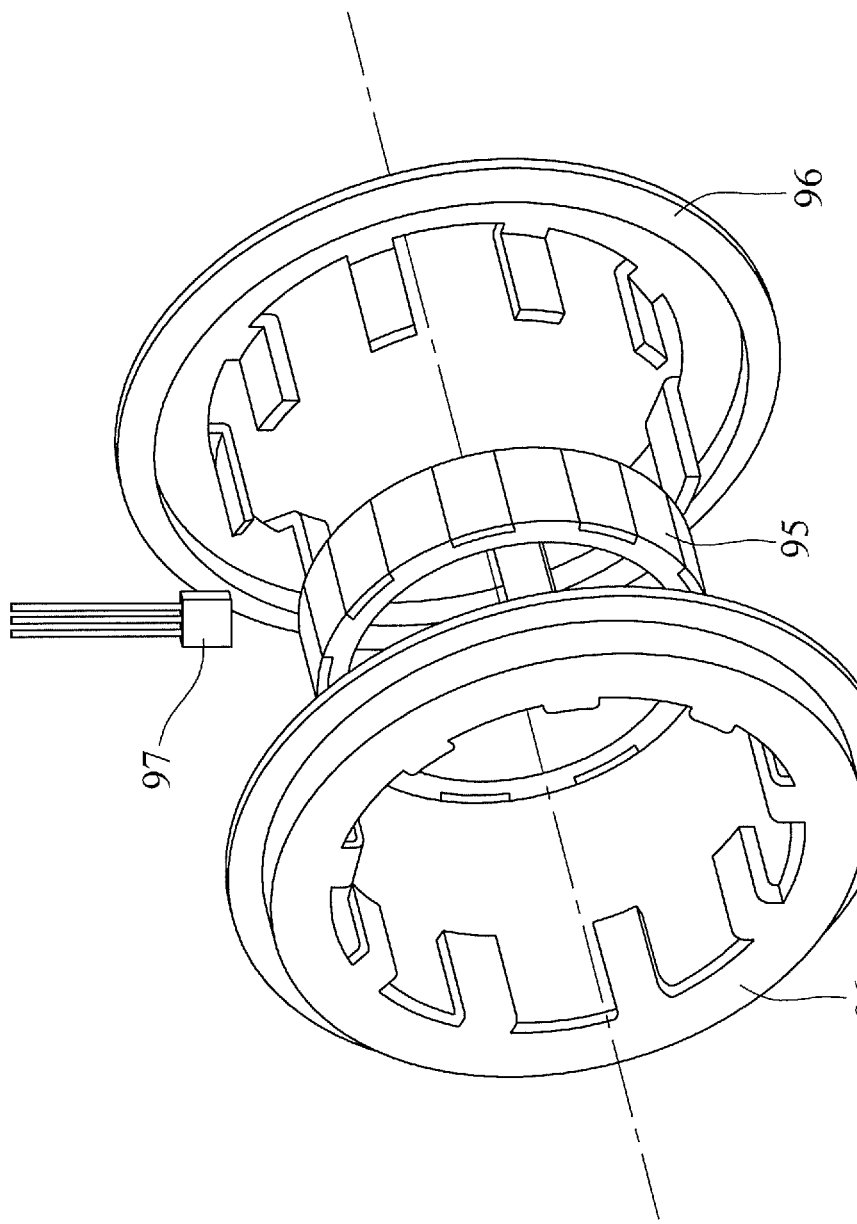
FIG. 2 is an exploded perspective view of a conventional torque detecting device equipped with a Hall induction system.
Figure 3:
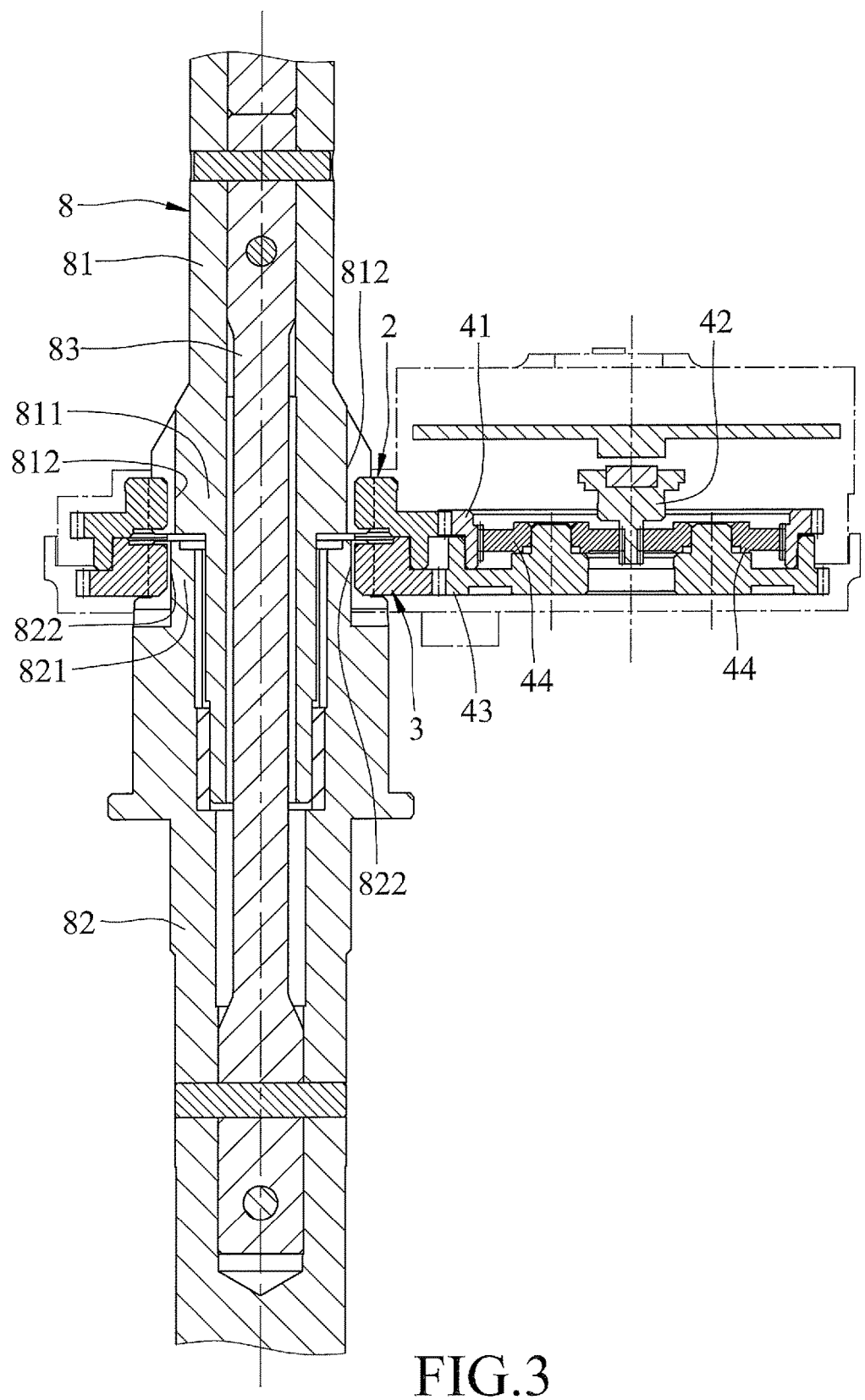
FIG. 3 is a sectional view of an embodiment of a torque detecting device according to the disclosure mounted to a torque transmitting device.
Figure 4:
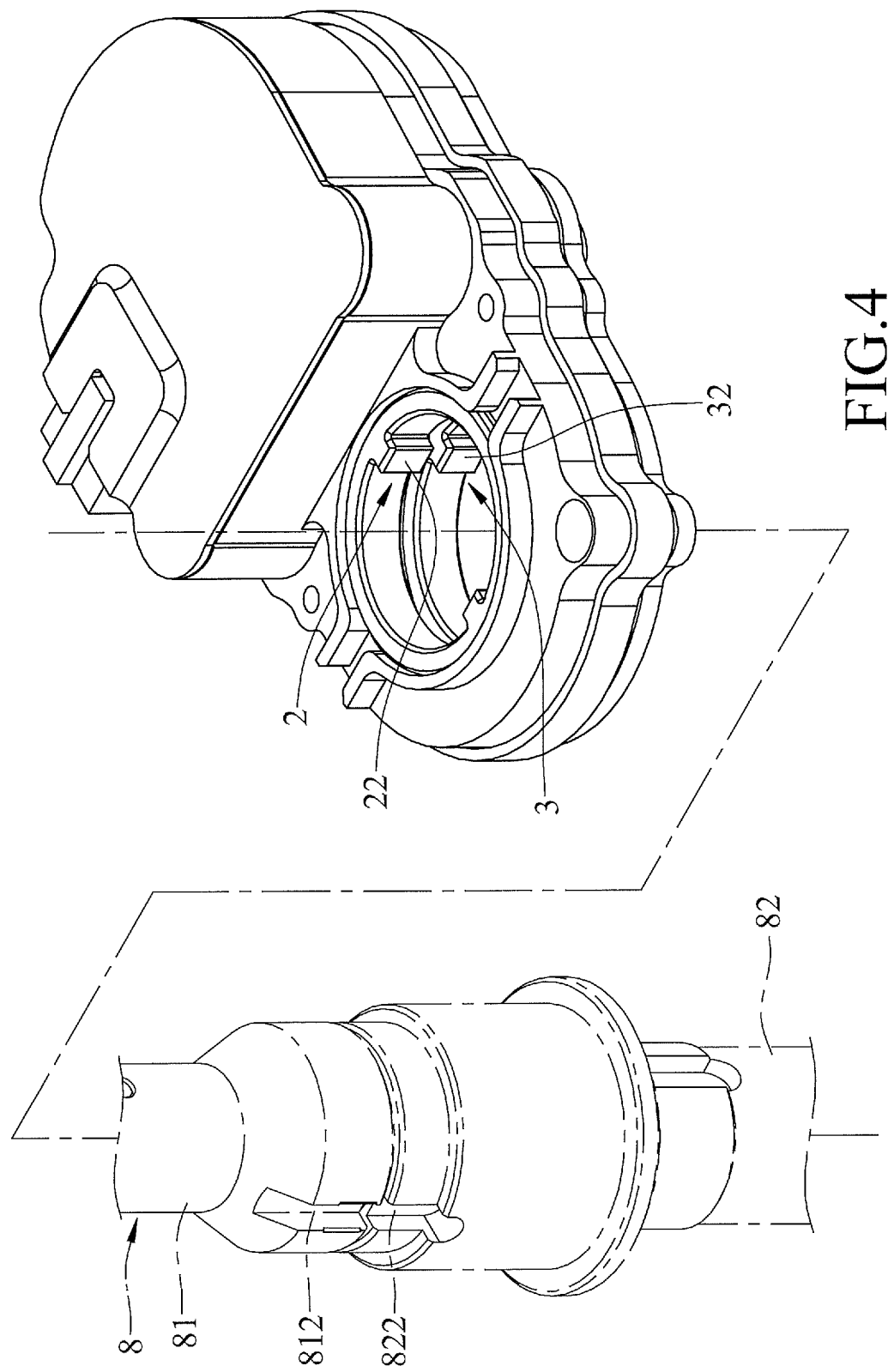
FIG. 4 is a perspective view of the embodiment.
Figure 5:
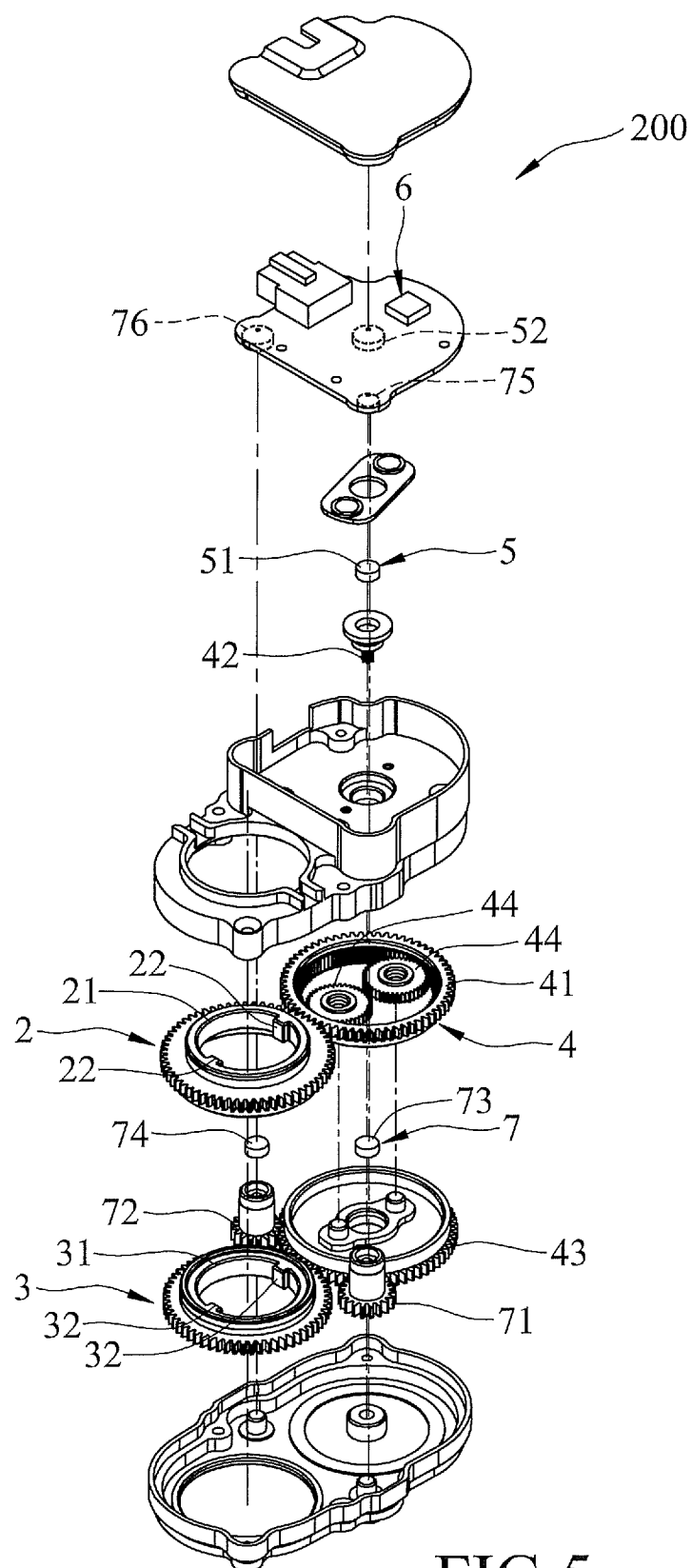
FIG. 5 is an exploded perspective view of the embodiment.

Referring to FIGS. 3, 4 and 5, an embodiment of the torque detecting device 200 according to the disclosure is adapted to be mounted to a torque transmitting device 8. The torque transmitting device 8 includes an input shaft 81 that is rotatable, an output shaft 82 that is rotatable relative to the input shaft 81, and a torsion bar 83 connected between the input shaft 81 and the output shaft 82. The input shaft 81 has a first shaft body 811 formed with a pair of first guide grooves 812. The output shaft 82 has a second shaft body 821 formed with a pair of second guide grooves 822.

The torsion bar 83 has the same physical characteristics as a torsion spring, i.e., a torsion of the torsion bar 83 is equal to the product of rigidity of the torsion bar 83 and a twisted angle to which the torsion bar 83 is subjected. A stopper mechanism (not shown) is disposed between the input shaft 81 and the output shaft 82 for limiting a twisting angle of the torsion bar 83 to a range that is usually between +/−5 degrees.

If the output shaft 82 is unloaded, the output shaft 82 is co-rotatable with the input shaft 81, i.e., the rotation of the input shaft 81 when being applied with a steering force does not result in the deformation of the torsion bar 83.

When the output shaft 82 is restricted, rotation of the input shaft 81 when being applied with a steering force results in deformation of the torsion bar 83, and an additional rotational angle of the input shaft 81 and a torque of the input shaft 81 relative to the output shaft 82 are in a linear proportional relationship.

The torque detecting device 200 includes an input gear 2, an output gear 3, a planet gear unit 4, a first angle sensing unit 5, a calculating unit 6 and a second angle sensing unit 7.

The input gear 2 is adapted to be sleeved on the input shaft 81, and has a first extension hole 21 that is adapted for extension of the first shaft body 811 of the input shaft 81 therethrough, and a pair of first protrusions 22 that protrude inwardly into the first extension hole 21 and that are adapted for engaging respectively the first guide grooves 812.

The output gear 3 is adapted to be sleeved on the output shaft 82, and has a second extension hole 31 that is adapted for extension of the second shaft body 821 of the input shaft 81 therethrough, and a pair of second protrusions 32 that protrude inwardly into the second extension hole 31 and that are adapted for engaging respectively the second guide grooves 822.

Figure 6:
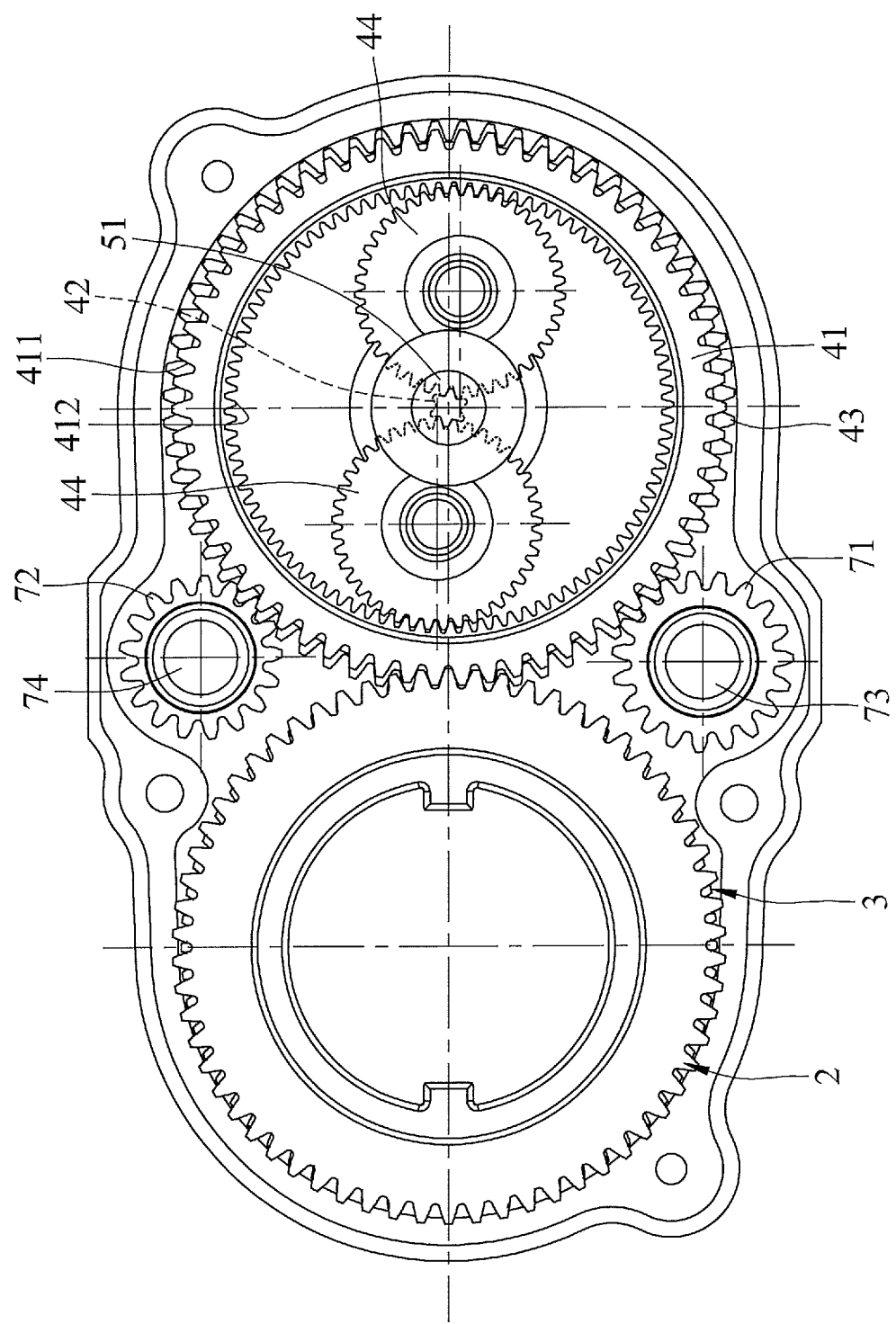
FIG. 6 is a fragmentary top view of the embodiment.
Figure 7:
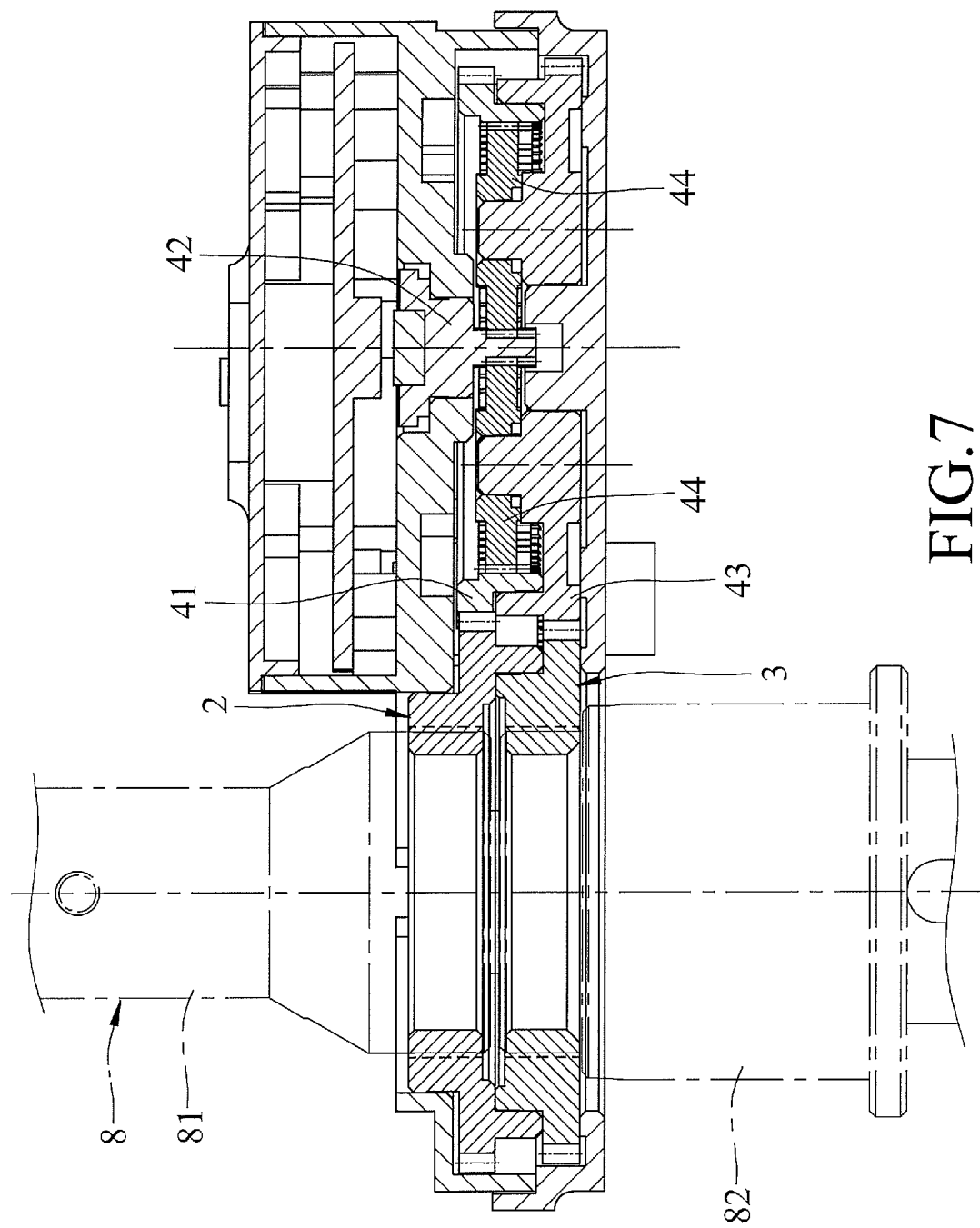
FIG. 7 is a sectional view of the embodiment.

Referring to FIGS. 5, 6 and 7, the planet gear unit 4 includes a ring gear 41 that meshes with the input gear 2, a sun gear 42 that is disposed in the ring gear 41, a carrier gear 43 that meshes with the output gear 3, and a plurality of planet gears 44 that are coupled rotatably to the carrier gear 43, that are disposed between the sun gear 42 and the ring gear 41, and that mesh with the ring gear 41 and the sun gear 42.

The ring gear 41 has a plurality of external teeth 411 meshing with the input gear 2, and a plurality of internal teeth 412 meshing with the planet gears 44.

The number of the external teeth 411 of the ring gear 41 is the same as that of the teeth of the input gear 2. That is, a relationship of $T_{(E)}=T_{(I)}$ is satisfied, where $T_{(E)}$ represents the number of the external teeth 411 of the ring gear 41, and $T_{(I)}$ represents the number of the teeth of the input gear 2. In this embodiment, each of the numbers of the external teeth 411 of the ring gear 41 and the teeth of the input gear 2 is 62.

The number of the internal teeth 412 of the ring gear 41 is the number of teeth of the sun gear 42 multiplied by a predetermined constant that is greater than 1. That is, a relationship of $T_{(R)}=T_{(S)}\times K$ is satisfied, where $T_{(R)}$ represents the number of the internal teeth 412 of the ring gear 41, $T_{(S)}$ represents the number of the teeth of the sun gear 42, and (K) represents the predetermined constant. In this embodiment, the number of the teeth of the sun gear 42 is 6, the predetermined constant is 15, and the number of the internal teeth 412 of the ring gear 41 is 90.

The carrier gear 43 has a plurality of external teeth, and a relationship of $T_{(P)}\times K=T_{(O)}\times(K+1)$ is satisfied, where $T_{(P)}$ represents the number of the external teeth of the carrier gear 43, and $T_{(O)}$ represents the number of the teeth of the output gear 3. In this embodiment, the number of the external teeth of the carrier gear 43 is 64, and the number of the teeth of the output gear 3 is 60.

The first angle sensing unit 5 includes a first magnet 51 that is disposed on the sun gear 42, and a first magnetic induction module 52 that is disposed for sensing an angle by which the first magnet 51 is rotated during rotation of the sun gear 42.

The calculating unit 6 is connected electrically to the first angle sensing unit 5, and is disposed for calculating a torque of the input shaft 81 relative to the output shaft 82 with reference to the angle sensed by the first angle sensing unit 5.

Referring to FIGS. 5, 6 and 8, the second angle sensing unit 7 includes first and second gears 71, 72 meshing with the carrier gear 43, a second magnet 73 disposed on the first gear 71, a third magnet 74 disposed on the second gear 72, a second magnetic induction module 75 connected electrically to the calculating unit 6 and disposed for sensing an angle by which the second magnet 73 is rotated during rotation of the first gear 71, and a third magnetic induction module 76 connected electrically to the calculating unit 6 and disposed for sensing an angle by which the third magnet 74 is rotated during rotation of the second gear 72.

The number of the teeth of the first gear 71 is different from that of the second gear 72. In this embodiment, the number of the teeth of the first gear 71 is 19, and the number of the teeth of the second gear 72 is 17.

Referring to FIGS. 5, 6 and 7, the calculating unit 6 calculates a rotational angle of the torque transmitting device 8 with reference to the angles by which the second and third magnets 73, 74 are respectively rotated and which are respectively sensed by the second magnetic induction module 75 and the third magnetic induction module 76.

Referring to FIGS. 3, 5 and 6, when the torque transmitting device 8 is in use, the input shaft 81 is generally connected to a steering wheel (not shown) of a vehicle, and the output shaft 82 is generally connected to a steering box (not shown) of the vehicle. If the output shaft 82 is unloaded, rotation of the steering wheel will result in corotation of the input shaft 81 and the output shaft 82, and a relative rotational angle between the input shaft 81 and the output shaft 82 will not exist. If the output shaft 82 is restricted and the input shaft 81 is applied with the steering force, and the additional rotational angle of the input shaft 81 relative to the output shaft 82, which is a twisted angle of the torsion bar 83, is sensed, then the torque of the torsion bar 83 can be calculated under the relationship that a torsion of the torsion bar 83 is equal to the product of rigidity of the torsion bar 83 and a twisted angle to which the torsion bar 83 is subjected.

With the engagement between the input gear 2 and the input shaft 81 and the engagement between the output gear 3 and the output shaft 82, the input and output gears 2, 3 can be easily coupled to the input and output shafts 81, 82. In addition, the simple structures of the first protrusions 22 of the input gear 2 and the second protrusions 32 of the output gear 3 allow for reduced manufacturing costs of the input and output gears 2, 3.

When the input shaft 81 and the output shaft 82 are rotated, the ring gear 41 and the carrier gear 43 are driven respectively by the input shaft 81 and the output shaft 82 to rotate, thereby driving rotation of the sun gear 42 via the planet gears 44.

According to a first equation with respect to the planet gear unit 4:

$$\phi_{(S)} = ((T_{(R)}/T_{(S)})+1)\phi_{(P)} - (T_{(R)}/T_{(S)})\phi_{(R)},$$

where $T_{(S)}$ is, as mentioned above, the number of the teeth of the sun gear 42, $T_{(R)}$ is, as mentioned above, the number of the internal teeth 412 of the ring gear 41, $\phi_{(S)}$ is the rotational angle of the sun gear 42, $\phi_{(P)}$ is the rotational angle of the carrier gear 43, and $\phi_{(R)}$ is the rotational angle of the ring gear 41.

When the output shaft 82 is co-rotatable with the input shaft 81, since the number of the teeth of the sun gear 42 is 6, and the number of the internal teeth 412 of the ring gear 41 is 90, a second equation of $\phi_{(S)} = 16\phi_{(P)} - 15\phi_{(R)}$ is rendered.

The rotational angle of the carrier gear 43 and the rotational angle of the ring gear 41 are designed to satisfy a third equation of $\phi_{(P)}/\phi_{(R)} = 15/16$. Therefore, when substituting the relationship into the second equation, the rotational angle of the sun gear 42 can be derived to be zero degrees, which means that the sun gear 42 is not rotated, and accordingly, the first magnet 51, which is disposed on the sun gear 42, is not rotated. The torque of the input shaft 81 relative to the output shaft 82, according to the angle by which the first magnet 51 is rotated that is sensed by the first magnetic induction module 52, is consequently calculated by the calculating unit 6 to be zero.

When the output shaft 82 is restricted and the input shaft 81 is applied with the steering force to be rotated by the additional rotational angle (C) relative to the output shaft 82, the input gear 2 is also rotated by the additional rotational angle (C) relative to the output gear 3, and consequently the ring gear 41 is rotated by the additional rotational angle (C) relative to the carrier gear 43, so that a fourth equation of $\phi_{(S)} = 16\phi_{(P)} - 15(\phi_{(R)} + C)$ can be derived from the first equation. By substituting the third equation into the fourth equation, a fifth equation of $\phi_{(S)} = -15C$ can be rendered, which means that, the rotational angle of the sun gear 42 is fifteen times the additional rotational angle (C), and the rotational direction of the sun gear 42 is opposite to that of the input shaft 81. As such, the relative rotational angle (C) between the input shaft 81 and the output shaft 82 is enlarged via the rotational angle of the sun gear 42. At this moment, the first magnet 51 is rotated during the rotation of the sun gear 42, and when the first magnetic induction module 52 detects the rotational angle of the first magnet 51, the torque of the input shaft 81 relative to the output shaft 82 can be calculated by the calculating unit 6. In this embodiment, the range of rotation of the sun gear 42 is designed to be +/−120 degrees, which means that the range of the additional rotational angle (C) is +/−8 degrees. Since the abovementioned twisting angle of the torsion bar 83 is restricted to between +/−5 degrees, it does not exceed the limitation of the range of the additional rotational angle (C).

Moreover, during the abovementioned movement of the torque transmitting device 8, since rotation of the carrier gear 43 drives rotations of the first gear 71 and the second gear 72, and since the numbers of the teeth between the first gear 71 and the second gear 72 are not the same, the rotational angles of the second magnet 73 and the third magnet 74 are not the same. The rotational angles of the second magnet 73 and the third magnet 74 are sensed respectively by the second magnetic induction module 75 and the third magnetic induction module 76, so that the calculating unit 6 can calculate the angle by which the torque transmitting device 8 is rotated, with reference to the angles sensed by the second magnet 73 and the third magnet 74, and the ratio of the number of the teeth between the first gear 71 and the second gear 72.

Simply put, since the number of the teeth of the first gear 71 is 19, and the number of the teeth of the second gear 72 is 17, when the first gear 71 rotates for 17 revolutions, the second gear 72 is to rotate for 19 revolutions. At this moment, the first gear 71 and the second gear 72 are moved respectively back to their original positions. Therefore, with the difference of the rotational angles between the second magnet 73 and the third magnet 74 being sensed, the angle by which the torque transmitting device 8 is rotated can be calculated.

In this embodiment, since the ratio of the numbers of the teeth between the carrier gear 43 and the output gear 3 is 64/60, the ratio of the rotation speeds is 60/64, that is, 0.9375. When it is configured that the rotational angle of the output gear 3 ranges at least from 800 degrees to −800 degrees (i.e., the range of the rotational angle of the output gear 3 is at least 1600 degrees), and the output gear 3 in this embodiment is accordingly exemplified to have the range of the rotational angle between 1900 and 3000 degrees, the range of the rotational angle of the carrier gear 43 will be between (1900×0.9375) and (3000×0.9375) degrees, that is, between 1781 and 2812 degrees, which, in turn, when represented by the numbers of the revolutions, the revolutions rotated by the carrier gear 43 ranges between 1781/360 and 2812/360, that is, 4.9 to 7.8.

As such, the least common multiple of the numbers of the teeth of the first gear 71 and the second gear 72 should be between (4.9×64) and (7.8×64), i.e., between 314 and 499. With reference to the least common multiple of 323, the number of the teeth of the first gear 71 is to be set as 17, and the number of the teeth of the second gear 72 is to be set as 19.

It should be noted herein that, the incorporation between the input gear 2 and the ring gear 41 and the incorporation between the output gear 3 and the planet gears 44, apart from being realized by gears as in this embodiment, may also be realized by pulleys and a belt, or by sprockets and a chain, which are to yield similar effects.

Moreover, apart from what is disclosed in this embodiment for the numbers of the teeth assigned to the incorporated pairs of the gears, other sets of numbers can be assigned as well as long as a similar effect can be achieved. Furthermore, in this embodiment, all gears are made of plastic materials; however, what is disclosed herein should not be imposed as a limitation of implementation.

In practical application, the torque detecting device can be applied to various electric power vehicles, such as an electric bicycle, an electric wheelchair and so on.

From the foregoing, the torque detecting device according to the disclosure provides the following advantage:

(1) The torque detecting device can enlarge the additional rotational angle (C) to be sensed by a factor of 15, so that the detecting range is enlarged and the sensing accuracy is significantly improved in comparison with the conventional Hall element type torque detecting device disclosed in the prior art.

(2) The torque detecting device enlarges the additional rotational angle (C) via a mechanical mechanism, so that possibility of the conventional Hall element type torque detecting device malfunctioning due to external electrical interference can be avoided.

(3) Since the additional rotational angle of the conventional Hall element type torque detecting device to be sensed is very small, the requirements of the structural configuration and the precision of the Hall element are higher. Moreover, the design of the claw-shaped stators demands a magnetic circuit analysis and therefore results in a high degree of difficulty associated with the manufacturing process. Moreover, the production of the claw-shaped stators has a disadvantage of being easily deformed during assembly. In contrast, since the operation of the present invention is performed by plastic gears, and since the manufacture of the plastic gears is a very mature technology, the design and manufacturing of the torque detecting device of the disclosure is relatively easy.

(4) In comparison with another conventional torque detecting device which is equipped with two planet gear units, the torque detecting device of the disclosure with a single planet gear unit has a simpler structure and can be more easily operated. In addition, the calculation method in obtaining the steering torque is relatively easy.

In sum, by virtue of the present of the planet gear unit 4 and the arrangements among the internal teeth 412, the sun gear 42, the planet gears 44, the carrier gear 43, the input gear 2 and the output gear 3, the additional rotational angle (C) between the input shaft 81 and the output shaft 82 can be enlarged via the sun gear 42, thereby facilitating torque calculation, and avoiding the drawbacks of high cost due to the high requirements of the structural configuration and the precision of the Hall element associated with the conventional torque detecting devices equipped with Hall elements. Moreover, in comparison with another conventional torque detecting device which is equipped with two planet gear units, the torque detecting device of the disclosure with a single planet gear unit has a simpler structure and can be more easily operated.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A torque detecting device adapted to be mounted to a torque transmitting device, the torque transmitting device including rotatable input and output shafts, said torque detecting device comprising:
   an input gear adapted to be sleeved on the input shaft;
   an output gear adapted to be sleeved on the output shaft;
   a planet gear unit including
      a ring gear that meshes with said input gear,
      a sun gear that is disposed in said ring gear,
      a carrier gear that meshes with said output gear, and
      a plurality of planet gears that are coupled rotatably to said carrier gear, that are disposed between said sun gear and said ring gear, and that mesh with said ring gear and said sun gear such that, when said input gear is rotated in a rotational direction relative to said output gear by a first angle, said sun gear is driven to rotate in an opposite rotational direction by a second angle that is greater than the first angle;
   a first angle sensing unit including a first magnet disposed on said sun gear, and a first magnetic induction module disposed for sensing an angle by which said first magnet is rotated during rotation of said sun gear; and
   a calculating unit connected electrically to said first angle sensing unit, and disposed for calculating a torque of said input shaft relative to said output shaft with reference to the angle sensed by said first angle sensing unit.

2. The torque detecting device as claimed in claim 1, wherein:
   said second angle is the first angle multiplied by a predetermined constant that is greater than 1;
   said ring gear has a plurality of external teeth meshing with said input gear, and a plurality of internal teeth meshing with said planet gears; and
   relationships of $T_{(E)}=T_{(I)}$, $T_{(R)}=T_{(S)} \times K$, and $T_{(P)} \times K = T_{(O)} \times (K+1)$ are satisfied, where $T_{(E)}$ represents the number of said external teeth of said ring gear, $T_{(I)}$ represents the number of the teeth of said input gear, $T_{(R)}$ represents the number of said internal teeth of said ring gear, $T_{(S)}$ represents the number of the teeth of said sun gear, (K) represents the predetermined constant, $T_{(P)}$ represents the number of the teeth of said carrier gear, and $T_{(O)}$ represents the number of the teeth of said output gear.

3. The torque detecting device as claimed in claim 2, wherein said teeth of said carrier gear are formed on an external surrounding surface of said carrier gear.

4. The torque detecting device as claimed in claim 1, further comprising a second angle sensing unit that includes first and second gears meshing with said carrier gear, the number of the teeth of said first gear being different from that of said second gear.

5. The torque detecting device as claimed in claim 4, wherein said second angle sensing unit further includes:
   a second magnet disposed on said first gear;
   a third magnet disposed on said second gear;
   a second magnetic induction module connected electrically to said calculating unit, and disposed for sensing an angle by which said second magnet is rotated during rotation of said first gear;
   a third magnetic induction module connected electrically to said calculating unit, and disposed for sensing an angle by which said third magnet is rotated during rotation of said second gear; and
   said calculating unit is disposed for calculating an angle by which the output shaft is rotated with reference to the angles sensed by said second and third magnetic induction modules.

6. The torque detecting device as claimed in claim 4, wherein:
   the number of the teeth of said first gear is 19; and
   the number of the teeth of said second gear is 17.

7. The torque detecting device as claimed in claim 2, wherein the predetermined constant is 15.

8. The torque detecting device as claimed in claim 2, wherein:
   each of the number of said external teeth of said ring gear and the number of the teeth of said input gear is 62;
   the number of the teeth of said sun gear is 6;
   the number of said internal teeth of said ring gear is 90;
   the number of the teeth of said carrier gear is 64; and
   the number of the teeth of said output gear is 60.

9. The torque detecting device as claimed in claim 2, wherein:
   said input gear has a first extension hole that is adapted for extension of a first shaft body of the input shaft therethrough, and a first protrusion that protrudes inwardly into said first extension hole and that is adapted for engaging a first guide groove formed in the first shaft body; and said output gear has a second extension hole that is adapted for extension of a second shaft body of the input shaft therethrough, and a second protrusion that protrudes inwardly into said second extension hole and that is adapted for engaging a second guide groove formed in the second shaft body.

10. A torque detecting device adapted to be mounted to a torque transmitting device, the torque transmitting device including rotatable input and output shafts, said torque detecting device comprising:
an input gear adapted to be sleeved on the input shaft;
an output gear adapted to be sleeved on the output shaft;
a planet gear unit including:
a ring gear that meshes with said input gear,
a sun gear that is disposed in said ring gear,
a carrier gear that meshes with said output gear, and
a plurality of planet gears that are coupled rotatably to said carrier gear, that are disposed between said sun gear and said ring gear, and that mesh with said ring gear and said sun gear such that, when said input gear is rotated in a rotational direction relative to said output gear by a first angle, said sun gear is driven to rotate in an opposite rotational direction by a second angle that is greater than the first angle,
wherein:
said second angle is the first angle multiplied by a predetermined constant that is greater than 1,
said ring gear has a plurality of external teeth meshing with said input gear, and a plurality of internal teeth meshing with said planet gears, and
relationships of $T_{(E)}=T_{(I)}$, $T_{(R)}=T_{(S)} \times K$, and $T_{(P)} \times K = T_{(O)} \times (K+1)$ are satisfied, where $T_{(E)}$ represents the number of said external teeth of said ring gear, $T_{(I)}$ represents the number of the teeth of said input gear, $T_{(R)}$ represents the number of said internal teeth of said ring gear, $T_{(S)}$ represents the number of the teeth of said sun gear, (K) represents the predetermined constant, $T_{(P)}$ represents the number of the teeth of said carrier gear, and $T_{(O)}$ represents the number of the teeth of said output gear.

11. The torque detecting device as claimed in claim 10, further comprising:
a first angle sensing unit including a first magnet disposed on said sun gear, and a first magnetic induction module disposed for sensing an angle by which said first magnet is rotated during rotation of said sun gear;
a calculating unit connected electrically to said first angle sensing unit, and disposed for calculating a torque of said input shaft relative to said output shaft with reference to the angle sensed by said first angle sensing unit; and
a second angle sensing unit that includes first and second gears meshing with said carrier gear, the number of the teeth of said first gear being different from that of said second gear.

12. The torque detecting device as claimed in claim 11, wherein said second angle sensing unit further includes:
a second magnet disposed on said first gear;
a third magnet disposed on said second gear;
a second magnetic induction module connected electrically to said calculating unit, and disposed for sensing an angle by which said second magnet is rotated during rotation of said first gear;
a third magnetic induction module connected electrically to said calculating unit, and disposed for sensing an angle by which said third magnet is rotated during rotation of said second gear; and
said calculating unit is disposed for calculating an angle by which the output shaft is rotated with reference to the angles sensed by said second and third magnetic induction modules.

13. The torque detecting device as claimed in claim 11, wherein:
the number of the teeth of said first gear is 19; and
the number of the teeth of said second gear is 17.

14. The torque detecting device as claimed in claim 10, wherein the predetermined constant is 15.

15. The torque detecting device as claimed in claim 10, wherein:
each of the number of said external teeth of said ring gear and the number of the teeth of said input gear is 62;
the number of the teeth of said sun gear is 6;
the number of said internal teeth of said ring gear is 90;
the number of the teeth of said carrier gear is 64; and
the number of the teeth of said output gear is 60.

16. The torque detecting device as claimed in claim 10, wherein:
said input gear has a first extension hole that is adapted for extension of a first shaft body of the input shaft therethrough, and a first protrusion that protrudes inwardly into said first extension hole and that is adapted for engaging a first guide groove formed in the first shaft body; and
said output gear has a second extension hole that is adapted for extension of a second shaft body of the input shaft therethrough, and a second protrusion that protrudes inwardly into said second extension hole and that is adapted for engaging a second guide groove formed in the second shaft body.

17. The torque detecting device as claimed in claim 10, wherein said teeth of said carrier gear are formed on an external surrounding surface of said carrier gear.

* * * * *